July 23, 1968 JAMES E. WEBB 3,394,359

ADMINISTRATOR OF THE NATIONAL AERONAUTICS AND SPACE ADMINISTRATION

DIGITAL MEMORY SENSE AMPLIFYING MEANS

Filed May 21, 1964

INVENTOR
GEORGE C. MILLIGAN

BY [signature]

ATTORNEY

United States Patent Office 3,394,359

Patented July 23, 1968

3,394,359

DIGITAL MEMORY SENSE AMPLIFYING MEANS

James E. Webb, Administrator of the National Aeronautics and Space Administration with respect to an invention of George C. Milligan, Altadena, Calif.

Filed May 21, 1964, Ser. No. 369,338
4 Claims. (Cl. 340—174)

ABSTRACT OF THE DISCLOSURE

A magnetic core memory is described in which sensing circuits are connected in parallel with interrogate windings for sensing the state of memory cores coupled to the windings. The memory is comprised of a plurality of magnetic cores respectively arranged in rows and columns. Each of the magnetic cores constitutes a multiaperture device and is capable of defining a "1" state, a "0" state, and a "prime" state. A plurality of interrogate windings are provided with each being coupled to the cores of a different one of the columns. A plurality of sensing circuits are provided wtih each being connected in parallel with a different one of the interrogate windings. Interrogate means apply signals to the interrogate windings in a direction to switch the cores coupled thereto to a "1" state. Those core elements defining a "prime" state will present a relatively high impedance so that the applied signal will be diverted to the lower impedance sensing circuit.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates generally to memory apparatus capable of storing digital information and more particularly to improved sense amplifier means for use with digital memories of the magnetic core type.

Most all digital computers and data processing apparatus employ a memory comprised of bistable magnetic cores for storing digital information. Bistable magnetic cores have two stable states of magnetic remanence which can be respectively used to represent "0" and "1" binary digits. Each magnetic core in a memory can be switched to a selected remanent state by applying proper polarity currents to windings coupled thereto. The state of a magnetic core can be interrogated by determining whether or not the core switches when signals are applied to windings coupled thereto for driving the core to a known state. Whether or not the core switches is conventionally detected by sensing whether a signal is induced in a sense winding coupled to the core. The signal so induced in the sense winding is usually of a very small amplitude and consequently fairly sensitive and expensive sense amplifiers are usually required to detect the induced signal.

It is an object of the present invention to provide improved sense amplifying means suitable for use with magnetic core digital memories.

Briefly, in accordance with the present invention, a relatively low impedance sensing circuit is connected in parallel with the interrogation winding of a core such that when an interrogation signal is applied to the winding, a significant portion of the interrogation signal will be steered to the sensing circuit, rather than traverse the interrogation winding, if the interrogation winding presents a relatively high impedance. The interrogation winding will present a high impedance to signals which are of a polarity tending to switch the core.

The sensing circuit can be comprised of cascaded stages capable of introducing signal gain. In a preferred embodiment of the invention, each stage includes a bistable magnetic core, capable of introducing flux gain. Thus, the current diverted from the interrogation winding of the memory core can be used to set a first stage core. The first stage core can then be similarly interrogated at a later time so that current diverted from its interrogation winding will set a second stage core. By proper use of the winding turns ratios and by progressively increasing the size of the cores in successive stages, an output signal will be provided by the last sensing circuit stage which signal has a considerably greater magnitude than that normally provided by the memory core.

The teachings of the invention are as equally applicable to memories using all known types of magnetic cores. Thus, the sensing technique introduced herein can be used with most single aperture and multiaperture magnetic core memories. A typical latter type of memory is disclosed in detail herein.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figures 1, 2, 3:
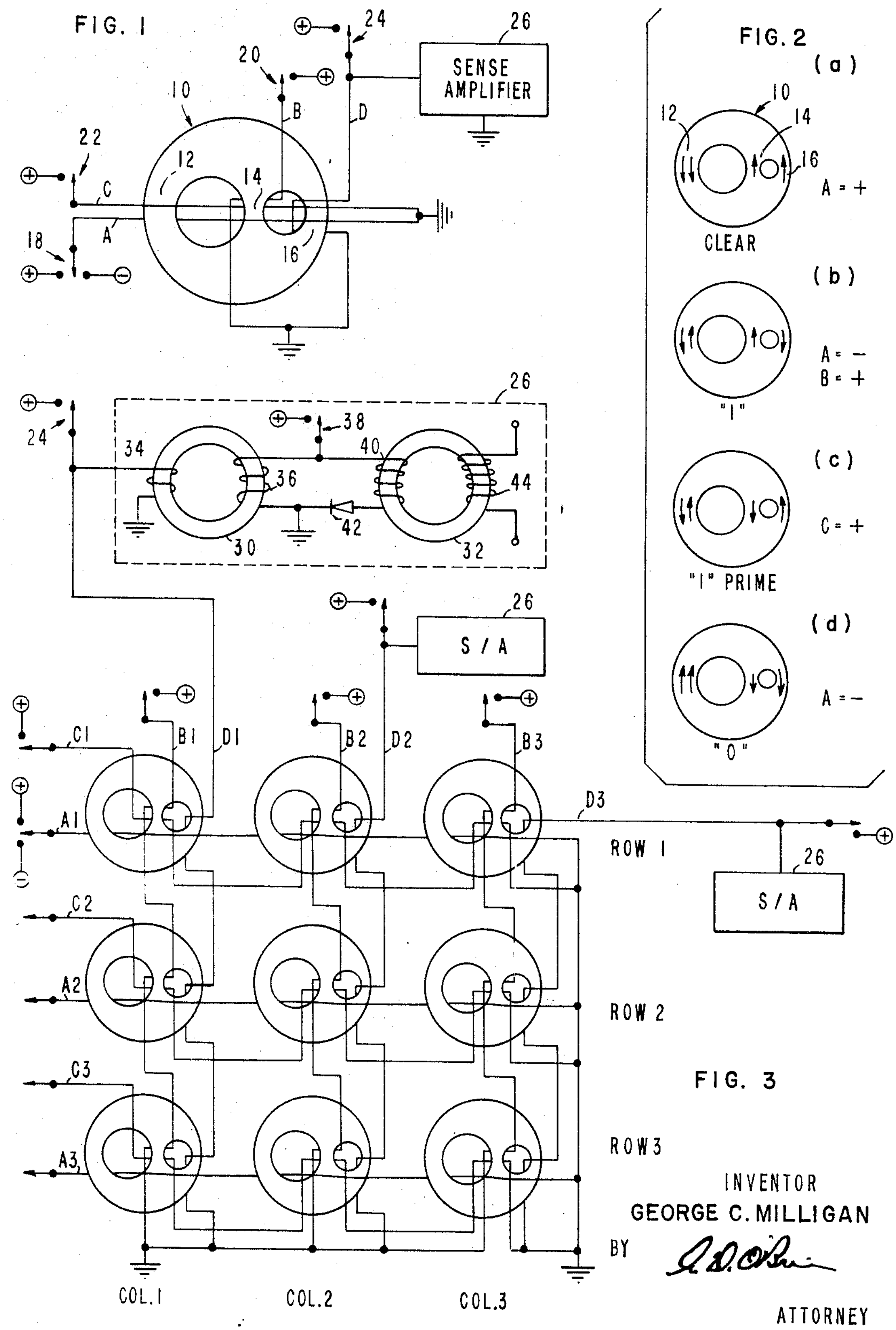
FIGURE 1 is a diagrammatic view of a typical magnetic memory core illustrating the various windings conventionally coupled thereto together with sense amplifying means in accordance with the invention connected to the interrogation winding.
FIGURE 2 is a diagrammatic illustration showing the various flux states which can be assumed by the core of FIGURE 1.
FIGURE 3 illustrates a substantially conventional memory matrix and sense amplifying means in accordance with the invention for use therewith.

Attention is now called to FIGURE 1 of the drawings which illustrates a conventional two aperture magnetic core device 10, often called a transfluxor. The transfluxor 10 has both a large and a small aperture which are spaced so as to define three legs respectively identified as 12, 14, and 16.

FIGURE 2(*a*) diagrammatically illustrates one state of flux orientation in the transfluxor 10. It will be noted that all of the flux is directed in a counterclockwise direction. FIGURE 2(*b*) illustrates a second state of flux orientation in which the flux is directed in a clockwise direction about the small aperture. FIGURE 2(*c*) illustrates a third state of flux orientation in the transfluxor 10 and differs from the state shown in FIGURE 2(*b*) by virtue of the fact that the flux is directed in a counterclockwise direction around the small aperture. FIGURE 2(*d*) illustrates a fourth state of flux orientation in which all of the flux in the transfluxor is directed in a clockwise direction.

As will be more readily understood hereinafter, the four flux orientations definable by the transfluxor 10 permit the transfluxor to be interrogated non-destructively. That is, whereas the information stored in conventional single aperture cores is destroyed when the core is interrogated, the information is not so destroyed when the transfluxor is interrogated. As a consequence, the use of a transfluxor memory permits the elimination of the write-after-read phase normally required in the use of single aperture magnetic core memories. As has been pointed out, the teachings of the invention herein can be used equally as well with either single or multiple aperture magnetic cores and it should be understood that the illustration of a multiaperture core embodiment is not intended as a restriction of the invention.

In order to write information into and read information from the transfluxor 10, signals of appropriate polarity must be applied to windings coupled to the transfluxor. Thus, drive select winding A connected between a single-pole double-throw switch 18 and ground is coupled to leg 12. Switch 18 can selectively connect one end of winding A to a source of either positive or negative potential. A prime winding B is connected between a single-pole double-throw switch 20 and ground and is inductively coupled to leg 14. Similarly, winding C is connected between single-pole single-throw switch 22 and ground and is also inductively coupled to leg 14. Interrogate winding D is connected between single-pole single-throw switch 24 and ground and is inductively coupled to leg 16.

By connecting switch 18 to the source of positive potential, a positive current will be developed in winding A which will orient the flux downwardly in leg 12 to thereby drive the transfluxor 10 to the flux orientation state illustrated in FIGURE 2(*a*). This state will be referred to as the "clear" state. By connecting switch 18 to the source of negative potential, a current will be driven through winding A which will tend to switch the flux in leg 12 to an upward direction to thereby define the flux orientation state illustrated in FIGURE 2(*d*). This state will be referred to as the binary digit "0" state. If switch 20 is closed concurrently with switch 18 being connected to the source of negative potential, the flux in leg 14 will be prevented from turning downwardly and as a consequence the transfluxor will be driven to the flux orientation state illustrated in FIGURE 2(*b*). This state will be referred to as the binary digit "1" state. It is to be noted that if switch 20 is closed when switch 18 is open, it will have no effect on the flux orientation in transfluxor 10 if the transfluxor defines either the "clear" state or the "0" state. If the "clear" state is defined, the signal developed in winding B will merely tend to further saturate the flux in leg 14. If the "0" state is defined, the signal in winding B will tend to re-orient the flux in leg 14 but will be unable to inasmuch as it will be insufficient to reverse the flux in the large leg 12 and can only further saturate the flux in the small leg 16.

If switch 22 is closed while the transfluxor 10 defines the "1" state, the flux in legs 14 and 16 around the small aperture will reverse to thereby define the state illustrated in FIGURE 2(*c*) which will be referred to as the "1" prime state. If switch 22 is closed while either the "clear" or "0" states are defined, it will have no effect on the flux orientation in the transfluxor.

In order to interrogate the transfluxor 10 of FIGURE 1, switch 22 can be initially closed to thereby drive the transfluxor 10 that had previously defined the flux orientation state of FIGURE 2(*b*) to the flux orientation of FIGURE 2(*c*). As noted, if any state other than that illustrated in FIGURE 2(*b*) was defined, the closure of switch 22 will have no effect. Subsequently, switch 24 can be closed which has the effect of orienting the flux in leg 16 in a downward direction. It should be apparent that the transfluxor will switch only if it defines the "1" prime state in which event it will switch back to the "1" state. This switching, in accordance with the prior art, can be detected by a sense winding (not shown) coupled to either legs 14 or 16. The signal induced in the sense winding by the switching however is of a small amplitude which must be detected by relatively sensitive and expensive sense amplifying means. In accordance with the invention herein, in lieu of utilizing a sense winding coupled to either of the legs 14 and 16, a sense amplifying circuit 26 is connected in parallel with the interrogation winding D.

The sense amplifying circuit 26 presents a relatively low impedance to a signal applied to the interrogation winding D. On the other hand, the interrogation winding will present a relatively high impedance to a signal applied thereto which signal is of a polarity tending to switch the core coupled to the interrogation winding. Thus, when the transfluxor 10 defines the state of FIGURE 2*c* and when a signal is applied through switch 24 to the interrogation winding D, the interrogation winding will initially present a much higher impedance to the signal than will the sense amplifier circuit 26. Thus, until the transfluxor 10 switches, a substantial portion of the current applied to the winding D will be diverted or steered into the sense amplifying circuit 26. After the transfluxor switches, then the winding D presents a very low impedance and an extremely small amount of current, if any, will be steered to the sense amplifying circuit 26. In the event the transfluxor 10 defined any state other than that of FIGURE 2*c*, winding D would have presented a low impedance to the signal applied thereto and no significant current would have been coupled to the sense amplifying circuit 26. Inasmuch as the amplitude of the current applied to winding D and diverted to the sense amplifying circuit 26 can be significantly greater than the current normally induced in a sense winding coupled to one of the legs 14 or 16, the sense amplifying circuit 26 need not be nearly as sensitive or expensive as conventionally used sense amplifying circuits.

Attention is now called to FIGURE 3 of the drawings which illustrates a memory matrix comprised of transfluxor magnetic cores of the type shown in FIGURE 1. The matrix illustrated in FIGURE 3 is comprised of three rows and three columns but it of course should be appreciated that a matrix of any size can be constructed in accordance with the invention. Each matrix row can be used to store a different computer word. Thus, it is desirable to be able to write information into or read information from all of the transfluxors in any particular row, in parallel or simultaneously. Each matrix column includes transfluxors which store corresponding bits of different words.

More particularly, the transfluxors of row 1 of the matrix are identically threaded by winding A1 and winding C1 respectively corresponding to windings A and C of FIGURE 1. The transfluxors of column 1 are similarly coupled to windings B1 and D1 respectively corresponding to windings B and D of FIGURE 1. A different sense amplifying circuit 26 is connected to each different interrogation winding.

In order to write information into a selected memory location, e.g., row 1, all of the row 1 transfluxors are initially driven to the "clear" state of FIGURE 2*a* by connecting the winding A1 to the source of positive potential. Then, in order to drive the transfluxors in row 1 to either a "0" or "1" state, the winding A1 is connected to the source of negative potential and the B windings associated with transfluxors in which it is desired to store a "1," are connected to a source of positive potential. The B windings can be responsive to stages of a memory input register (not shown). Thus, all of the transfluxors in row 1 coupled to a D winding in which a current is developed will be switched to the "1" state while all other transfluxors in the row will be switched to the "0" state. In this manner, information is written into the memory. Of course, in order to write information into other locations, the A windings corresponding thereto should be appropriately controlled. The control of the A windings is preferably exercised in response to stages of a memory address register (not shown).

In order to interrogate a particular memory location, the C winding coupled thereto is connected to the source of positive potential. Thus, in order to interrogate the transfluxors of row 1, winding C1 is connected to the source of positive potential to thereby switch those row 1 transfluxors defining a "1" state to a "1" prime state. At this point, it should be apparent that only one of the matrix rows can contain transfluxors in the "1" prime state. Thereafter, the D windings will all be connected to sources of positive potential. Those D windings coupled to transfluxors defining a "1" prime state will present a high impedance and will thus steer current into the sense amplifying circuit 26 connected in parallel therewith.

The sense amplifying circuits 26 can comprise a plurality of cascaded stages, each stage including a bistable magnetic core. Thus, the sense amplifying circuit connected to winding D1 includes cores 30 and 32 in the first and second stages thereof. Winding 34 is connected between switch 24 associated with winding D1, and ground. When current is diverted into winding 34 the flux in core 30 will be switched in a clockwise direction. A winding 36, having a greater number of turns than winding 34, is also provided on core 30 and is connected between ground and single-pole double-throw switch 38 adapted to engage a source of positive potential. Connected in parallel with winding 36 is a series circuit including winding 40 and diode 42. Winding 40 is inductively coupled to core 32 which has a winding 44 also coupled thereto. Winding 44 has a greater number of turns than winding 40.

In the operation of the sense amplifying circuit 26, when the transfluxor memory core is interrogated, core 30 will be switched to a set state if the transfluxor memory core associated therewith defines a "1" prime state. As noted, the current diverted from interrogation winding D1 into winding 34 can be significantly greater than the current normally derived from a sense winding coupled directly to the transfluxor memory core. After the interrogation signal has been applied through switch 24 to the interrogation winding D1, the switch 38 is closed to apply a current to winding 36 to reset the core 30. If the core 30 had been set, core winding 36 will present a high impedance to the current applied thereto and thus, the current applied through switch 38 will be diverted into winding 40 through diode 42. The current through winding 40 will set core 32. If on the other hand core 30 had not been initially set, winding 36 will not present a high impedance and core 32 will not be set. The setting of the core 32 by the current diverted into winding 40 will induce an output signal in winding 44 which has an amplitude considerably greater than the signal derivable from a sense winding coupled to the transfluxor memory core.

The sense amplifying circuit 26 provides a significantly larger output signal than the input signal provided thereto because of the flux gain introduced therein. That is, in each succeeding stage of the sense amplifier 26, a greater amount of flux is switched to thereby provide a larger signal at the output winding of the last sense amplifying circuit stage. The amount of flux switched in each of the amplifying circuit stages is determined by the ampere turns microseconds applied thereto with the limit of course being defined by the core material and dimensions. Thus, a relatively small amount of flux can be switched in core 30 by winding 34. The application, through switch 38 of a large current to windings 36 and 40 will enable winding 40 to switch a greater amount of flux in core 32. The amount of flux and rapidity with which it is switched of course determines the amplitude of the induced output signal.

From the foregoing, it should be appreciated that an improved apparatus has been disclosed herein for sensing signals provided by magnetic memory cores when interrogated. By steering a signal applied to an interrogation winding into a sense amplifying circuit connected in parallel therewith, and by constructing a sense amplifying circuit of cascaded stages, the complexity and expense of sense amplifying circuits is considerably reduced. It is recognized however that a time penalty is paid for the reduction in cost and complexity inasmuch as the signal gain introduced by the amplifying circuits is developed sequentially or progressively in the cascaded stages.

Although each of the sense amplifying stages has been disclosed as being comprised of a magnetic core with signal gain being achieved by a flux gain process, it should be appreciated that in an alternative embodiment transistor or vacuum tube stages can be used for achieving signal gain. Inasmuch as sensing in accordance with the invention herein is accomplished by apparatus completely independent of conventional sensing apparatus, both forms of sensing can be redundantly employed where extremely high reliability is desired.

It is further pointed out that although FIGURE 3 is directed to a memory in which information is accessed in parallel, considerable hardware reduction can be achieved if serial accessing is tolerable. Thus, a single sense amplifying circuit can be successively commutated to each of the interrogate windings. The commutation rate could of course be synchronized with the shifting of information between stages of the amplifying circuit.

What is claimed is:

1. A digital memory system comprising:

a plurality of magnetic cores respectively arranged in rows and columns;

each of said magnetic cores being capable of defining at least three different states of magnetic remenance respectively identifiable as a "1" state, "0" state, and a "prime" state;

a plurality of prime windings each respectively coupled to the cores of a different one of said rows;

selection means for selectively energizing one of said prime windings to switch the cores coupled thereto defining a "1" state to a "prime" state;

a plurality of interrogate windings each respectively coupled to the cores of a different one of said columns;

interrogate means for applying a signal to each of said interrogate windings in a direction to switch the cores coupled thereto defining a "prime" state to a "1" state whereby those cores defining a "prime" state will present a relatively high impedance to said interrogate means and those cores defining a state other than said "prime" state will present a relatively low impedance to said interrogate means; and a plurality of sensing circuit means each connected in parallel with a different one of said interrogate windings, each of said sensing circuit means presenting an impedance to said interrogate means which is less than said high impedance and more than said low impedance presented by said cores.

2. The combination of claim 1 wherein said sensing circuit includes at least one signal amplifying stage.

3. The combination of claim 2 wherein said signal amplifying stage includes a sensing magnetic core responsive to current diverted into said sensing circuit for switching to a first state; an interrogation winding coupled to said sensing magnetic core; and one or more flux amplifying circuit stages connected to said sensing magnetic core interrogation winding.

4. The combination of claim 3 wherein each of said flux amplifying circuit stages includes a magnetic core having an interrogation winding coupled thereto and wherein a drive winding coupled to the core in a subsequent stage is connected in parallel with each interrogation winding.

References Cited

UNITED STATES PATENTS

| | | | |
|---|---|---|---|
| 2,947,977 | 8/1960 | Bloch | 340—174 |
| 3,041,582 | 6/1962 | Cray | 340—174 |
| 3,125,743 | 3/1964 | Pohm et al. | 340—174 |
| 3,192,510 | 6/1965 | Flaherty | 340—174 |

STANLEY M. URYNOWICZ, Jr., *Primary Examiner.*